May 7, 1935.　　　　C. W. MANSUR　　　　2,000,769
NONMETALLIC GEAR WHEEL
Filed Aug. 17, 1932　　2 Sheets-Sheet 1
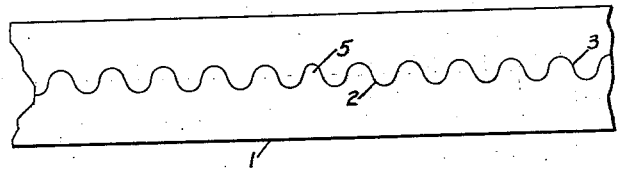
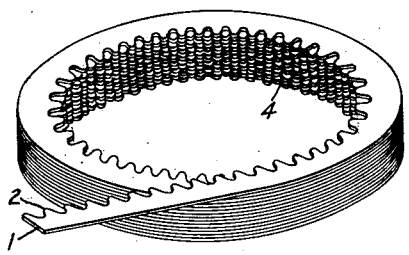
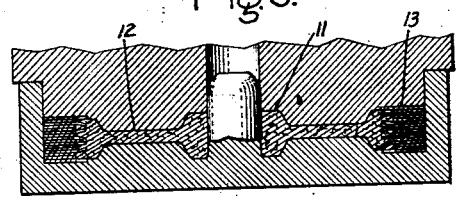
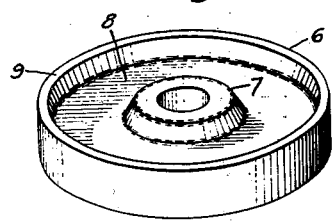
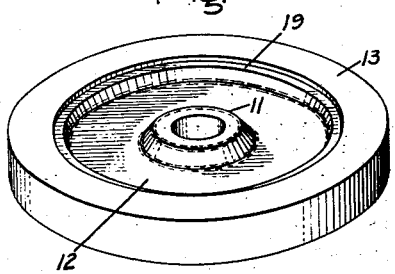
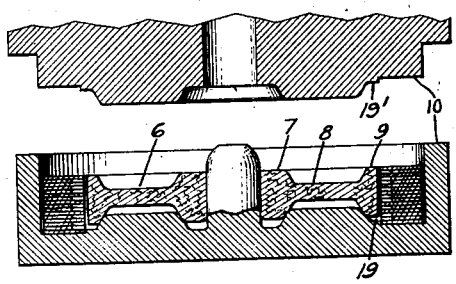
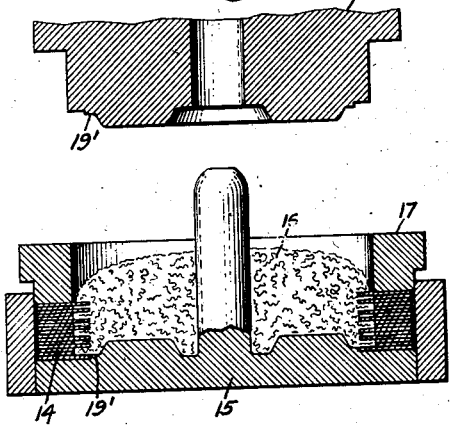
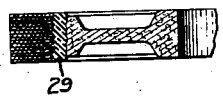
Inventor:
Clarence W. Mansur,
by Charles E. Tullar
His Attorney.

May 7, 1935. C. W. MANSUR 2,000,769
NONMETALLIC GEAR WHEEL
Filed Aug. 17, 1932 2 Sheets-Sheet 2
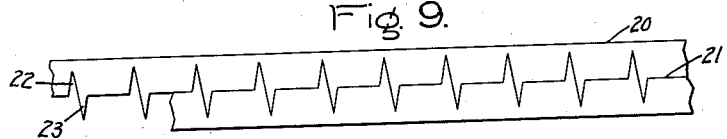
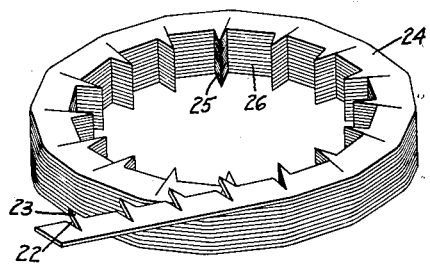
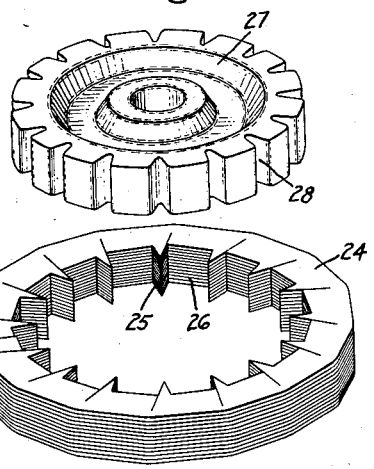
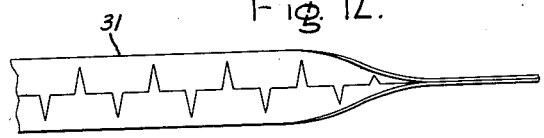
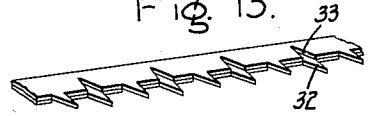
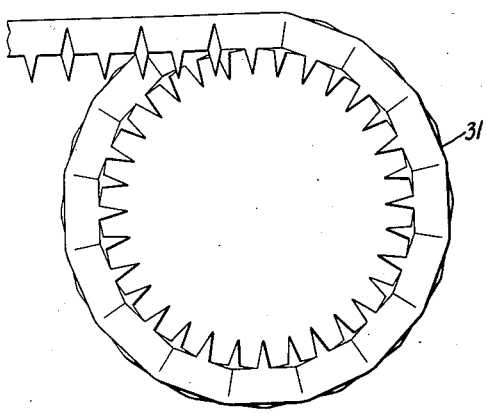
Inventor:
Clarence W. Mansur,
by Charles E. Tillar
His Attorney.

Patented May 7, 1935

2,000,769

UNITED STATES PATENT OFFICE 2,000,769

NONMETALLIC GEAR WHEELS

Clarence W. Mansur, Malden, Mass., assignor to General Electric Company, a corporation of New York Application August 17, 1932, Serial No. 629,149

12 Claims. (Cl. 154—2)

The present invention relates to non-metallic gear wheels or gear wheel blanks formed of spinnable textile fibres and an adhesive, for example an artificial resin such as a phenolic condensation product, which is converted into its infusible insoluble state by the application of heat and pressure.

One object of my invention is to provide an improved construction and arrangement in a gear wheel or gear wheel blank of this type wherein the rim and web, which in the manufacture of the gear wheel or gear wheel blank are made separately initially, are firmly bonded together in the finished structure. A further object of my invention is to provide an improved method of manufacturing such a gear wheel or gear wheel blank which can be carried out at low cost, and without waste of material, and which at the same time results in a thoroughly satisfactory product.

For the consideration of what I believe to be novel and my invention, attention is directed to the following specification and claims appended thereto.

In the drawings, Fig. 1 is a face view of a strip of woven non-metallic material such as cotton duck and illustrates an initial step in carrying out my invention; Fig. 2 is a perspective view showing the manner in which a strip as shown in Fig. 1 is spirally wound edgewise to form a member to be used as the rim of gear wheel or gear wheel blank; Fig. 3 is a perspective view of a preform which forms the web and hub of the gear wheel or gear wheel blank; Fig. 4 shows the parts of a mold with the members shown in Figs. 2 and 3 assembled therein; Fig. 5 is a view similar to Fig. 4 showing the members in the mold pressed together to form a gear wheel blank; Fig. 6 is a perspective view of a completed blank made in accordance with my invention; Fig. 7 is a view similar to Fig. 4 showing a modification; Fig. 8 is a detail sectional view showing a further modification; Figs. 9, 10 and 11 are views showing a modification of my invention; and Figs. 12, 13 and 14 are views showing a further modification.

In carrying out my improved method of manufacture, I first provide a strip of woven fabric 1, such as a suitable grade of cotton duck, having projections or teeth 2 on one edge, the fabric being treated with an adhesive, for example, an artificial resin such as a phenolic condensation product, and being of a width to form the rim of gear wheel blank. The strip may be formed by taking a piece of material of a width wide enough to form two strips as shown in Fig. 1 and splitting it longitudinally along the line indicated at 3. By this means, two strips are provided without waste of material. In the present instance, the teeth 2 are shown as being rounded but they may be pointed or of other suitable shape. The strip may be treated with the adhesive either before or after it is formed. Preferably, I treat a width of cotton duck, cut it into strips of the width shown in Fig. 1, and then cut the strips in two longitudinally as indicated in Fig. 1. I then wind a strip of suitable length edgewise on itself with the projections or teeth on the inside as shown in Fig. 2, to provide a structure of a thickness suitable to form the rim of the gear wheel blank in the finished structure. The strip may be wound by any suitable means. Preferably, however, I use a winding machine such as that shown in my Patent 1,970,536, patented August 14, 1934.

In the wound up structure, it is desirable that the teeth of successive layers be staggered relative to each other as is shown in Fig. 2. Ordinarily, this will be effected due to the stretching of the material in the winding machine, the teeth becoming arranged in staggered relation as a matter of course. In this connection, it is to be understood that an exact staggered arrangement of the teeth is not necessary but only an approximate staggered arrangement, the object being to leave irregularly arranged spaces between the teeth as is indicated at 4 in Fig. 2. If found desirable, the cutting tool for splitting the strip may be such that at spaced intervals it provides a tooth of irregular width which will serve to furnish an irregular arrangement of the teeth in the wound up construction. Such a tooth of irregular width is shown at 5 in Fig. 1.

For forming the hub and web of the gear, I provide a preform 6 as is shown in Fig. 3, the preform comprising a portion 7 which forms the hub, a portion 8 which forms the web, and a portion 9 which unites with the rim and forms a part of its inner portion. The preform may be made from suitable non-metallic material treated with an adhesive. For example, it may be made from small pieces of adhesive treated cotton duck which may be scrap material, for example, left from other manufacturing steps, or it may be made from unwoven cotton mixed with adhesive. The scrap material or other material from which the hub and web are to be made are placed in a suitable mold and pressed and heated in an initial manner to form a structure as shown in Fig. 3. The heating and pressure is such as to consolidate the material and cause it to stick together but is not carried along to an extent such as to cure the adhesive.

The members shown in Figs. 2 and 3 are placed in a suitable mold as indicated at 10 which may form a part of a hydraulic press and are subjected to heat and pressure to consolidate the structure and cure the adhesive. Fig. 5 shows the manner in which the two members of the mold are brought together to effect this operation. The method of molding material of this type to form gear wheel blanks is well known in the art and does not require a detailed description. The structure is molded under sufficient pressure and at the required temperature to effect the desired consolidation of the structure and the curing of the adhesive. The structure is then removed from the mold whereby there is produced a finished blank as shown in Fig. 6 wherein 11 indicates the hub of the blank, 12 the web of the blank and 13 the rim. The teeth may now be cut in the rim of the blank in the usual manner.

During the molding operation, the heat first softens the adhesive and the pressure causes the material at the periphery of the preform 6 to flow into spaces 4 and among the teeth 2. This is shown particularly in Fig. 5. By this means, an effective interlocking is provided between the web and the rim whereby the parts become strongly and integrally united with each other. This is one important feature of my invention.

In Fig. 7, I have shown a form of my invention wherein the hub and web are formed from unwoven textile material such as cotton, which has been treated with adhesive. The treating may be effected by mixing adhesive with the cotton fibres. In this arrangement, the rim member 14, which may be similar to the rim member shown in Fig. 2 and made in the same way, is placed in the bottom part 15 of the mold after which a suitable amount of the unwoven textile material 16 for forming the hub and web are placed loosely in the mold as shown in Fig. 7. In this instance, the upper mold member comprises two parts, a ring 17 and a central part 18. The ring 17 is placed on top of the rim member 14. The member 18 is of a size to enter the ring member 17 and engage with the material 16. After the material is in the mold, the parts of the mold, which may be part of a hydraulic press or placed in a hydraulic press, are forced together and heat applied to consolidate the structure and cure the adhesive in the well known manner.

Gear wheels of this type are of a special utility because of quietness of operation. I have found that the quietness of operation may be increased by inserting between the rim and the web material different than that of either the rim or the web. The insertion of such material appears to have the property of absorbing or breaking up vibrations whereby noise is decreased. An arrangement of this kind is shown in Fig. 8 wherein 29 indicates a material of a character different from that of either the rim or the web inserted between the rim and the web and molded in connection therewith to form an integral construction. The material 29 may comprise a strip of rubber or duck treated with rubber, such latter material being termed usually rubberized cloth. The insertion need not be thick, a relatively few layers of cloth or sheet rubber being sufficient.

If the gear wheel blank is to be provided with a metal hub, the hub may be placed in the mold and the material molded directly on it. For example, a metal hub such as that shown in my Patent No. 1,852,814, April 5, 1932, may be provided.

In gear wheels of this type, the portions formed from woven cloth are machined readily. However, non-metallic materials of other types, for example, unwoven textile fibres united by an adhesive as shown in Fig. 7, sometimes give difficulty in machining. To overcome any such difficulty, I provide the rim, adjacent to the web, with steps or grooves 19 as shown in the completed blank in Fig. 6 so that the material of the rim projects slightly beyond that of the web around the entire gear wheel blank. In other words, the rim is offset relatively to the web on both sides. By this arrangement, the side faces of the rim can be machined without the tool encountering the material of the web. Grooves 19 may be formed by providing the molds with shoulders 19' as shown in Figs. 4 and 7.

In Figs. 9, 10 and 11 is shown a modification wherein a strip 20 of woven textile material such as duck, treated with an adhesive, such as an artificial resin, is divided lengthwise along a zigzag line as indicated at 21, thus providing two strips having notches 22 and teeth 23. In this connection, it will be noted that the notches and teeth are formed without waste of material as the material from the notches of one strip forms the teeth of the other strip. A strip of suitable length comprising one of the pieces thus formed is then wound edgewise on itself, as shown in Fig. 10, to provide a ring member 24 having projections 25 between which are pockets 26. In the present instance, the strip is shown as being wound with the teeth of successive turns in alignment. However, this is only by way of example and the strip may be wound so that the teeth are irregularly arranged after the manner shown in Fig. 2.

For use in connection with a rim member 24, I provide a preform 27 similar to the preform shown in Fig. 3. It may be made from either woven or unwoven textile material treated with an adhesive and consolidated in an initial manner but without curing the adhesive. It is provided with pockets 28 adapted to receive the projections 25.

In constructing the finished gear wheel or gear wheel blanks, the members 24 and 27 are assembled in a suitable mold after the manner shown in Fig. 4, and heat and pressure applied to consolidated the construction and cure the adhesive.

In Figs. 12, 13 and 14 is shown a further modification for forming a ring member corresponding to the ring members shown in Figs. 2 and 10. In this modification, a strip 31 is cut longitudinally along an irregular line in a manner similar to that shown in Fig. 9 and is then bent lengthwise on itself to form a strip of double thickness as shown in Fig. 13, the strip being provided with projections 32 and notches 33. The strip, as shown in Fig. 13, is then wound edgewise after the manner shown in Fig. 14, thereby providing a ring member similar to that shown in Fig. 10. It may be utilized in constructing a gear wheel or gear wheel blank after the manner illustrated in the other figures of the drawing and already described.

With my improved method, it will be seen that I am enabled to construct a gear wheel or gear wheel blank without waste of material. At the same time, I provide a construction wherein an excellent bond is obtained between the rim and the web due to the interlocking which results from the toothed formation of the inner surface of the rim which provides pockets into which material of the web flows.

The method can be carried out by relatively unskilled labor and with relatively inexpensive tool equipment, and since there is no waste of material, I am enabled to manufacture a non-metallic gear wheel at low cost.

What I claim as new and desire to secure by Letters Patent of the United States is:

1. A gear wheel or gear wheel blank having a rim comprising a strip of woven cloth wound edgewise on itself and united by an adhesive, the inner edge of the strip having spaced projections, and a web comprising non-metallic material united by an adhesive, material of the web being located in the spaces among said projections for uniting the rim to the web.

2. A gear wheel or gear wheel blank having a rim comprising a strip of woven cloth wound edgewise on itself and united by an adhesive, the inner edge of the strip having spaced projections, and a web comprising non-metallic material united by an adhesive, material of the web being located in the spaces among said projections for uniting the rim to the web, the material of the web directly adjacent to the rim being different from that of the remainder of the web.

3. A non-metallic gear wheel or gear wheel blank comprising a rim of woven cloth united by an adhesive and a web of other non-metallic material, the material of the web merging into the rim throughout the width of the rim and united thereto by adhesive, characterized by the fact that the inner edges of the rim directly adjacent to the material of the web are grooved whereby the side faces of the rim may be machined without encountering material of the web.

4. The method of manufacturing a non-metallic gear wheel or gear wheel blank which comprises winding edgewise a strip of woven cloth having projections along one edge to form a ring with the projections on the inside, and molding a central portion of non-metallic material within the ring and around said projections on the ring.

5. The method of manufacturing a non-metallic gear wheel or gear wheel blank which comprises winding edgewise a strip of woven cloth having projections along one edge to form a ring with the projections on the inside, projections of successive turns being staggered relatively to each other to provide pockets on the inner surface of the ring, and molding a central portion of non-metallic material within the ring, portions of such central portion being caused to enter the pockets.

6. The method of manufacturing a gear wheel or gear wheel blank which comprises taking a strip of woven cloth treated with adhesive and having projections along one edge and winding it edgewise on itself with the projections on the inside to form a ring, and molding together the ring and a central portion comprising non-metallic material treated with adhesive, material of the central portion being caused to flow around said projections.

7. The method of manufacturing a gear wheel or gear wheel blank which comprises taking a strip of woven cloth treated with adhesive and having projections along one edge and winding it edgewise on itself with the projections on the inside to form a ring, the projections of successive turns being staggered relatively to each other, and molding together the ring and a central portion comprising non-metallic material treated with adhesive.

8. A member for use in the manufacture of non-metallic gear wheels comprising a strip of woven cloth having projections along one edge wound edgewise on itself to form a ring with the projections on the inside of the ring.

9. A member for use in the manufacture of non-metallic gear wheels comprising a strip of woven cloth having projections along one edge wound edgewise on itself to form a ring with the projections on the inside of the ring, the projections on successive turns being out of alignment with each other.

10. A member for use in the manufacture of non-metallic gear wheels comprising a strip of woven cloth doubled on itself longitudinally and having projections along one edge, said strip being wound edgewise to form a ring, thereby forming an inner surface on the ring of irregular outline.

11. The method of forming a ring member from non-metallic material which comprises taking a strip of material, cutting it longitudinally along an irregular line to form projections along one side of each piece, and winding edgewise one of the pieces thus formed, with the projections on the inside.

12. The method of forming a ring member from non-metallic material which comprises taking a strip of material, cutting it longitudinally along an irregular line and folding it on itself longitudinally to form projections along one side, and winding edgewise the strip with the projections on the inside.

CLARENCE W. MANSUR.